UNITED STATES PATENT OFFICE.

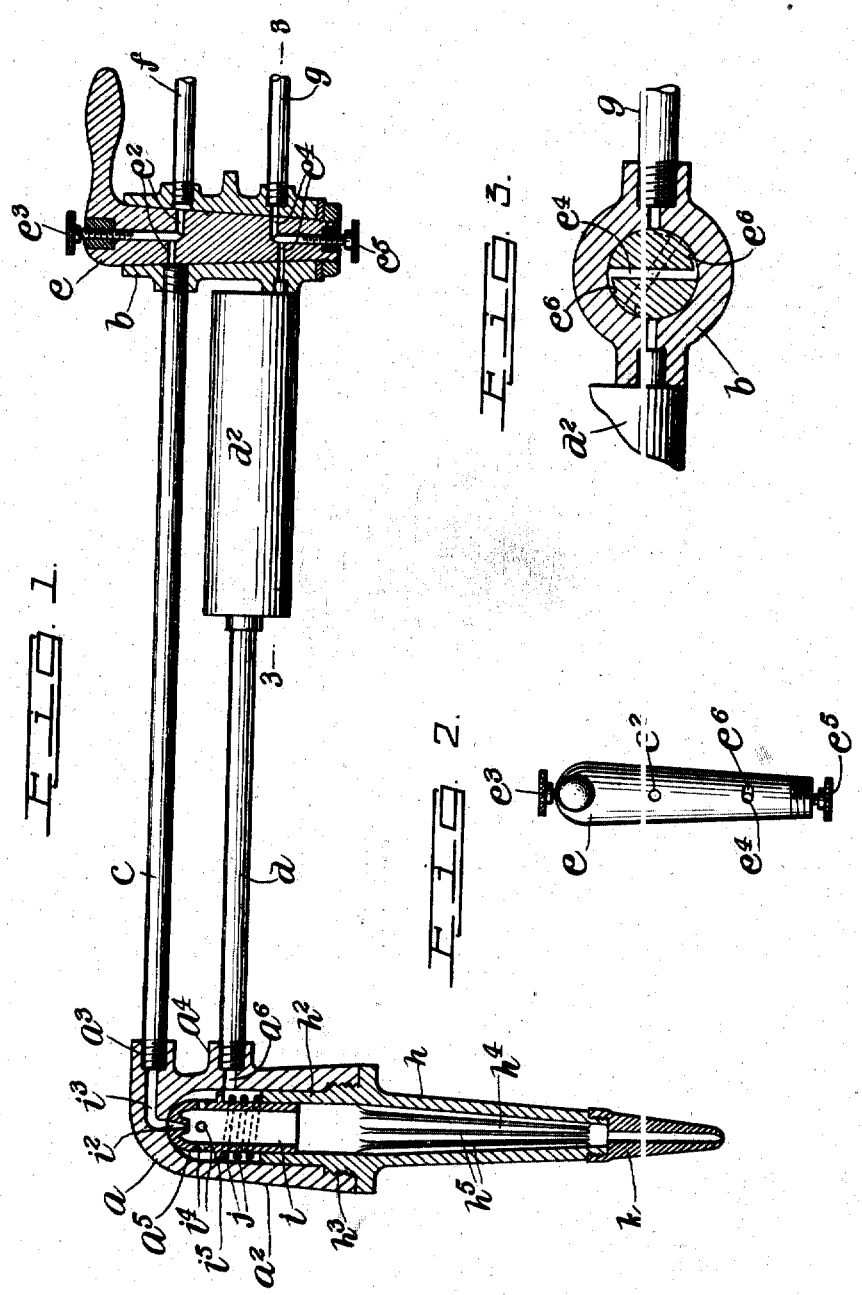

WALTER W. von TODENWARTH, OF RAHWAY, NEW JERSEY.

CONTROLLING-VALVE FOR ACETYLENE CUTTING AND WELDING TORCHES.

1,222,164.

Specification of Letters Patent.     Patented Apr. 10, 1917.

Application filed July 25, 1916. Serial No. 111,106.

*To all whom it may concern:*

Be it known that I, WALTER W. VON TODENWARTH, a citizen of the United States, and residing at Rahway, in the county of Union and State of New Jersey, have invented certain new and useful Improvements in Controlling-Valves for Acetylene Cutting and Welding Torches, of which the following is a specification, such as will enable those skilled in the art to which it appertains to make and use the same.

This invention relates to controlling valves for acetylene gas torches and particularly to devices of this class designed both for cutting and welding, and the object thereof is to provide an improved device for controlling the supply of oxygen and acetylene gas to the torch head which is simple in construction and operation, convenient of manipulation and which may be used wherever devices of this class are required.

This application containing subject-matter taken from a prior application filed by me September 24, 1915, Ser. No. 52,334, and the invention is fully disclosed in the following specification, of which the accompanying drawing forms a part, in which the separate parts of my improvement are designated by suitable reference characters in each of the views, and in which:—

Figure 1 is a sectional side view of my improved acetylene torch when used for welding purposes;

Fig. 2 a detail view of a valve controlling device shown in section in Fig. 1 and showing a modification; and, Fig. 3 a partial section on the line 3—3 of Fig. 1 and on an enlarged scale and showing the modification shown in Fig. 2.

In the practice of my invention, I provide a main torch head $a$ and a valve head $b$ connected by an oxygen pipe $c$ and an acetylene gas pipe $d$, and the acetylene gas pipe $d$ is provided with a flash back tank or flash back chamber $d^2$ which forms a part thereof and is of the usual form.

The oxygen pipe $c$ and acetylene gas pipe $d$ with the flash back tank or chamber $d^2$ serve as a handle for the device, and the valve head $b$ is provided with a valve $e$ and with a main oxygen supply tube $f$ and an acetylene gas tube $g$ which are preferably both flexible and which may be connected with an oxygen supply and with an acetylene gas supply in the usual manner.

The pipe $c$ and tube $f$ are placed in communication by passages $e^2$ in the valve $e$ controlled by a needle valve $e^3$, and the tube $g$ and the flash back tank or chamber $d^2$ are placed in communication by passages $e^4$ in the valve $e$ controlled by a needle valve $e^5$, and the valve $e$ is the master or key valve of the device, while the supply of oxygen and acetylene gas is controlled by the needle valves $e^3$ and $e^5$, and by means of this construction the exact amount of oxygen and acetylene gas admitted to the burner or burner tip may be controlled at all times, and this valve device is a combination of the main master key valve $e$ and the needle valves $e^3$ and $e^5$.

The torch head $a$ is of the usual form and comprises a main outer casing $a^2$ provided at its upper end with an elbow extension $a^3$ with which the pipe $c$ is connected and adjacent thereto with a threaded sleeve $a^4$ with which the pipe $d$ is connected, and a tubular and tapered nozzle $h$ is also provided, and this nozzle is provided with an extension $h^2$ which fits in the head $a^2$ and with a threaded portion $h^3$ which screws into the head $a^2$, and the nozzle $h$ is provided with an exterior tapered channel or passage $h^4$, the walls of which are provided with longitudinal ribs or fins $h^5$.

In the head $a^2$ is a chamber $a^5$ in which is placed a slidable sleeve $i$ which is closed at its upper end and open at its lower end, and the upper end of which is provided with an inwardly directed nozzle $i^2$, and the pipe $c$ communicates with a passage $i^3$ which communicates with the nozzle $i^2$, and the side walls of the sleeve $i$ are also provided with ports or passages $i^4$ which are placed a predetermined distance below the nozzle $i^2$, and the acetylene gas pipe $d$ communicates with the chamber $a^5$ through a passage $a^6$, and said sleeve $i$ is movable longitudinally in the chamber $a^5$ and is provided with a collar $i^5$ between which and the part $h^2$ is placed a spring $j$ which normally holds said sleeve in the position shown in Fig. 1, and said sleeve constitutes a sliding injector into which the oxygen and acetylene gas are admitted from the pipes $c$ and $d$, and said oxygen and acetylene gas are mingled in the sleeve $i$ and passed through the lower open end thereof into the discharge nozzle $h$, and the nozzle $h$ is provided with a burner tip $k$ designed for use in welding only, and by means of the tapered nozzle $i^2$ the oxygen is discharged into the sleeve $i$ in a spray fashion, and the acetylene being discharged into said sleeve below the nozzle $i^2$, a perfect mixture is obtained.

The object in making the sleeve or sliding injector $i$ movable, as shown and described is to accommodate the device to the expansion and contraction of the parts under heat or different degrees of heat, and the sleeve $i$ when made movable, in the manner herein shown and described, will not be destructively affected by the expansion and contraction of the part $a^5$ of the head $a$ under varying degrees of heat.

In Figs. 2 and 3 of the drawing, I have shown a slight modification which consists in providing the valve $e$, or the passages $e^4$ therein with oppositely directed recesses $e^6$ which are adapted to operate in connection with the corresponding ports or passages in the valve head $b$ and the object of this construction is to permit the acetylene gas to pass through the valve $e$ in advance of the passage of the oxygen through said valve in order to obtain the proper mixture in the torch head or to admit acetylene gas therein before the oxygen is admitted into said head.

My invention is not limited to the use of the valve controlling device in connection with the specific form of torch head herein shown and described, and said valve may be used in connection with devices of this class of any desired form and construction, and changes in and modifications of the construction herein shown and described may be made, within the scope of the appended claim, without departing from the spirit of my invention, or sacrificing its advantages.

Having fully described my invention, what I claim as new and desire to secure by Letters Patent, is:—

In a device of the class described, a ported valve device and a torch head, acetylene gas and oxygen pipes connected with said valve device, a main key valve rotatably mounted in said valve device and provided with ports or passages which correspond with the ports in said valve device, needle valves adjustably mounted in said main key valve and adapted to control the passage of acetylene gas and oxygen through said ports or passages, and means in said main key valve for permitting the passage of acetylene gas through one of said ports or passages in advance of the passage of oxygen through the other.

In testimony that I claim the foregoing as my invention I have signed my name, in presence of the subscribing witnesses, this 24th day of July, 1916.

WALTER W. von TODENWARTH.

Witnesses:
H. E. THOMPSON,
C. L. NEWELL.